(12) United States Patent
Shen

(10) Patent No.: US 7,924,554 B2
(45) Date of Patent: Apr. 12, 2011

(54) ELECTRONIC DEVICE HAVING MOVABLE DISPLAY

(75) Inventor: Wen-Bin Shen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 206 days.

(21) Appl. No.: 12/268,422

(22) Filed: Nov. 10, 2008

(65) Prior Publication Data

US 2010/0027206 A1    Feb. 4, 2010

(30) Foreign Application Priority Data

Aug. 1, 2008    (CN) .............................. 200820301685

(51) Int. Cl.
*H05K 5/00* (2006.01)
*E05D 11/00* (2006.01)
*H04M 1/00* (2006.01)

(52) U.S. Cl. ......... 361/679.21; 361/679.55; 361/679.58; 361/679.26; 361/679.27; 361/679.3; 455/575.3; 455/575.4; 16/223

(58) Field of Classification Search ............ 361/679.01, 361/679.02, 679.55–679.59, 679.21, 679.08, 361/679.09, 679.3; 134/32, 15; 345/156, 345/157, 168, 169, 184; 455/575.1, 575.3, 575.4, 575.8, 455; 200/329; 174/535
See application file for complete search history.

(56) References Cited

U.S. PATENT DOCUMENTS

| | | | |
|---|---|---|---|
| 2005/0187024 A1* | 8/2005 | Cho et al. ......................... | 463/46 |
| 2007/0105606 A1* | 5/2007 | Yoon et al. ................... | 455/575.4 |
| 2009/0145337 A1* | 6/2009 | Shen et al. ....................... | 108/39 |
| 2010/0053866 A1* | 3/2010 | Shen ........................... | 361/679.3 |
| 2010/0061049 A1* | 3/2010 | Shen ......................... | 361/679.21 |

\* cited by examiner

*Primary Examiner* — Jayprakash N Gandhi
*Assistant Examiner* — Jerry Wu
(74) *Attorney, Agent, or Firm* — Zhigang Ma

(57) ABSTRACT

An electronic device includes a display, a rotating member, a main body, a hinge, and a positioning member. The main body defining a holding groove in a top thereof. The rotating member defines a holding hole. The display is slidably mounted to the rotating member. The hinge includes a first fixed member and a second fixed member rotatable relative to the first fixed member, wherein the second fixed member is held in the holding hole, and the first fixed member is held in the holding groove. The positioning member mounted to the main body, wherein the positioning member comprises a positioning block inserted into the holding groove to secure the first fixed member of the hinge in the holding groove.

16 Claims, 7 Drawing Sheets

ELECTRONIC DEVICE HAVING MOVABLE DISPLAY

BACKGROUND

1. Technical Field

The present disclosure relates to electronic devices and, particularly, to an electronic device having a movable display.

2. Description of Related Art

As development of electronic technology, electronic devices, such as portable phones, personal digital assistants (PDAs) et al., become more and more popular. Most electronic devices are often equipped with displays for displaying information.

Usually, the displays are movable on the electronic devices for reduce volumes of the electronic devices, or for convenient operation. For example, a clamshell mobile phone generally has a main body and a rotatable display mounted to the main body via a hinge, the mobile phone has a small volume when the display is folded on the main body. However, the hinge is generally mounted to the display and the main body via many screws, which is time-consuming to assemble.

Therefore, an electronic device which overcomes the above-described deficiencies is desired.

DETAILED DESCRIPTION

Figure 1:
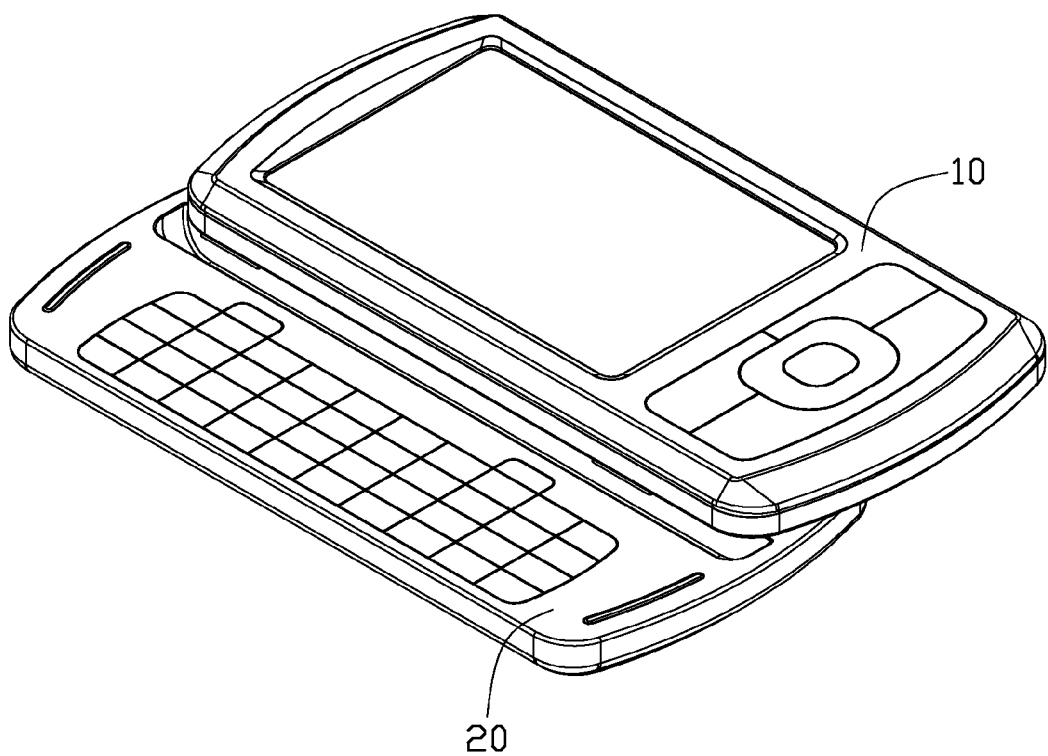
FIG. 1 is an assembled, isometric view of an exemplary embodiment of an electronic device, the electronic device including a main body, a display, and a rotating member.
Figure 2:
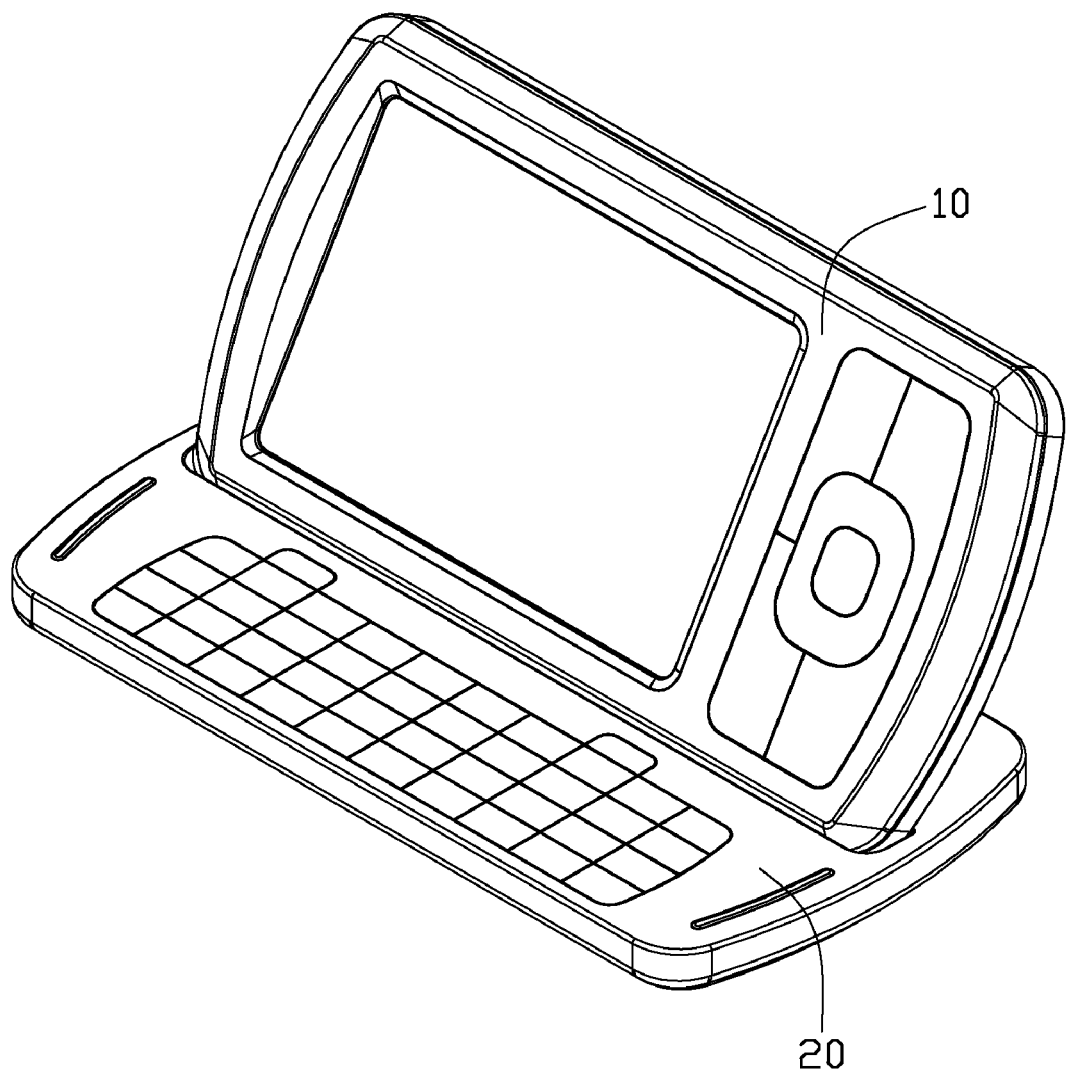
FIG. 2 is another assembled, isometric view of the electronic device of FIG. 1, with the display in a different position.
Figure 3:
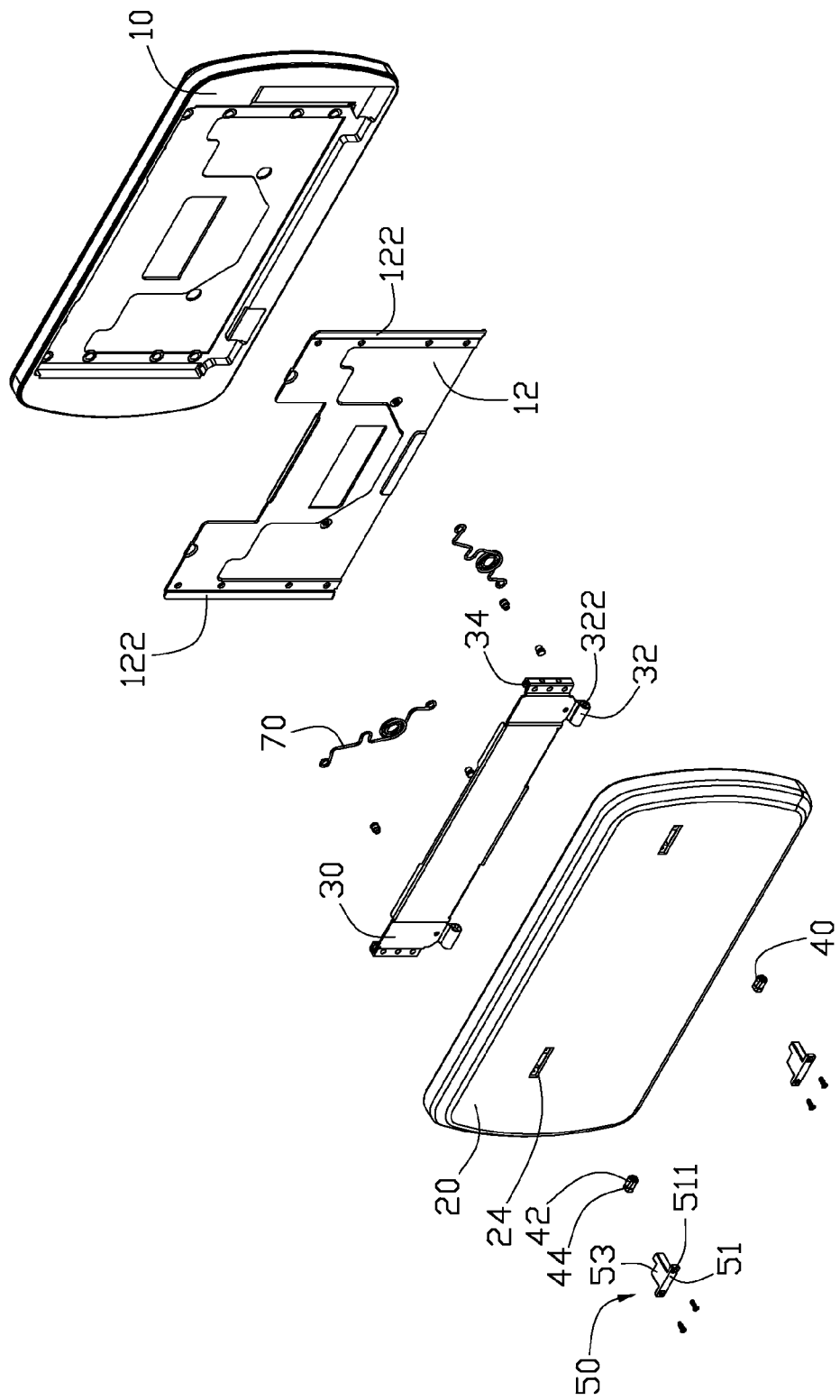
FIG. 3 is an exploded, isometric view of the electronic device of FIG. 1.

Referring to FIGS. 1 to 3, an exemplary embodiment of an electronic device, such as a personal digital assistant (PDA), includes a display 10, a main body 20, a sliding piece 12 mounted to a back of the display 10, a rotating member 30 pivotably mounted to the main body 20, two hinges 40, and two positioning members 50. The display 10 is slidable and rotatable with respect to the main body 20.

Figure 4:
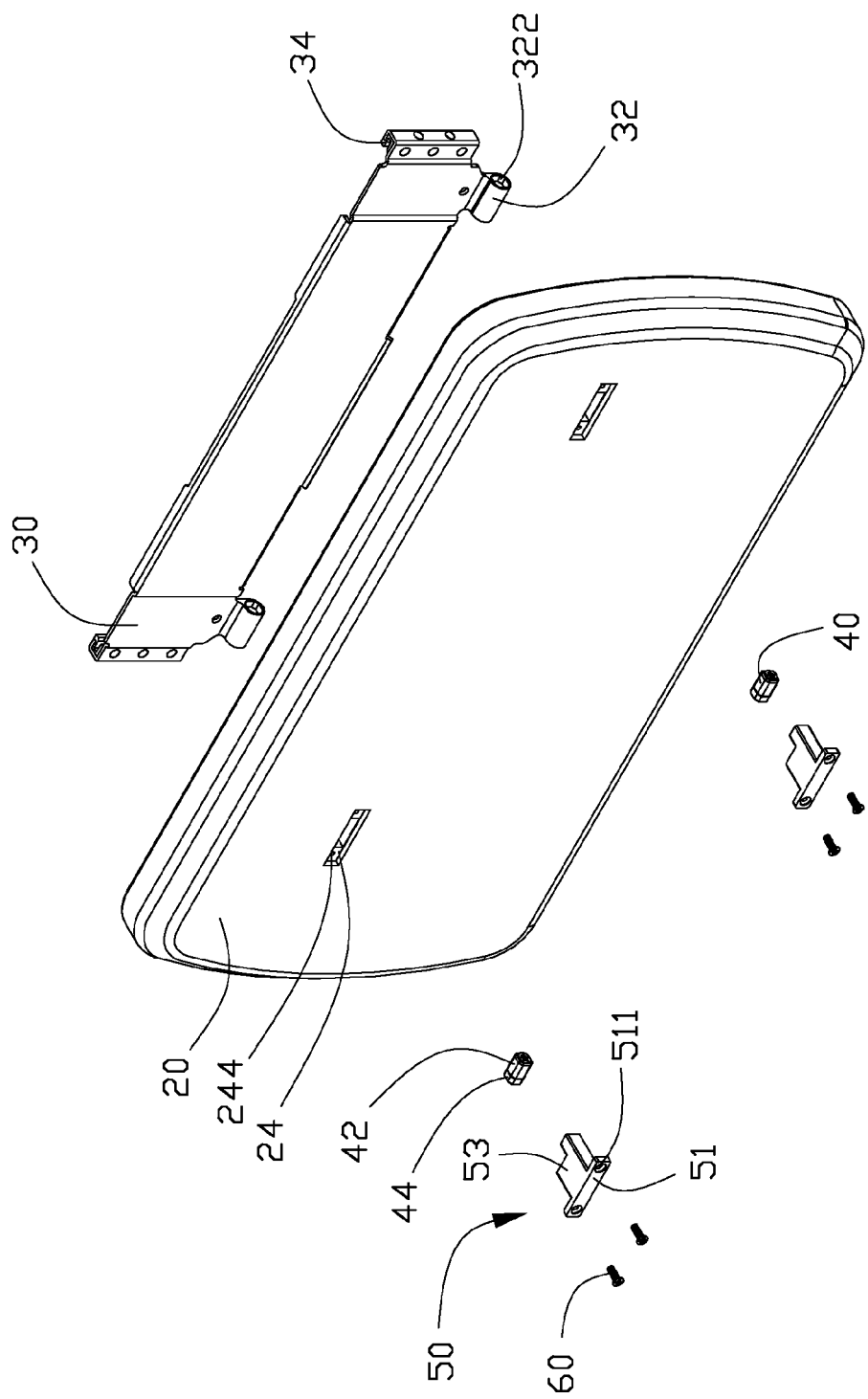
FIG. 4 is an enlarged, isometric view of the main body and the rotating member of FIG. 3, the rotating member including a hinge and a sleeve.
Figure 5:
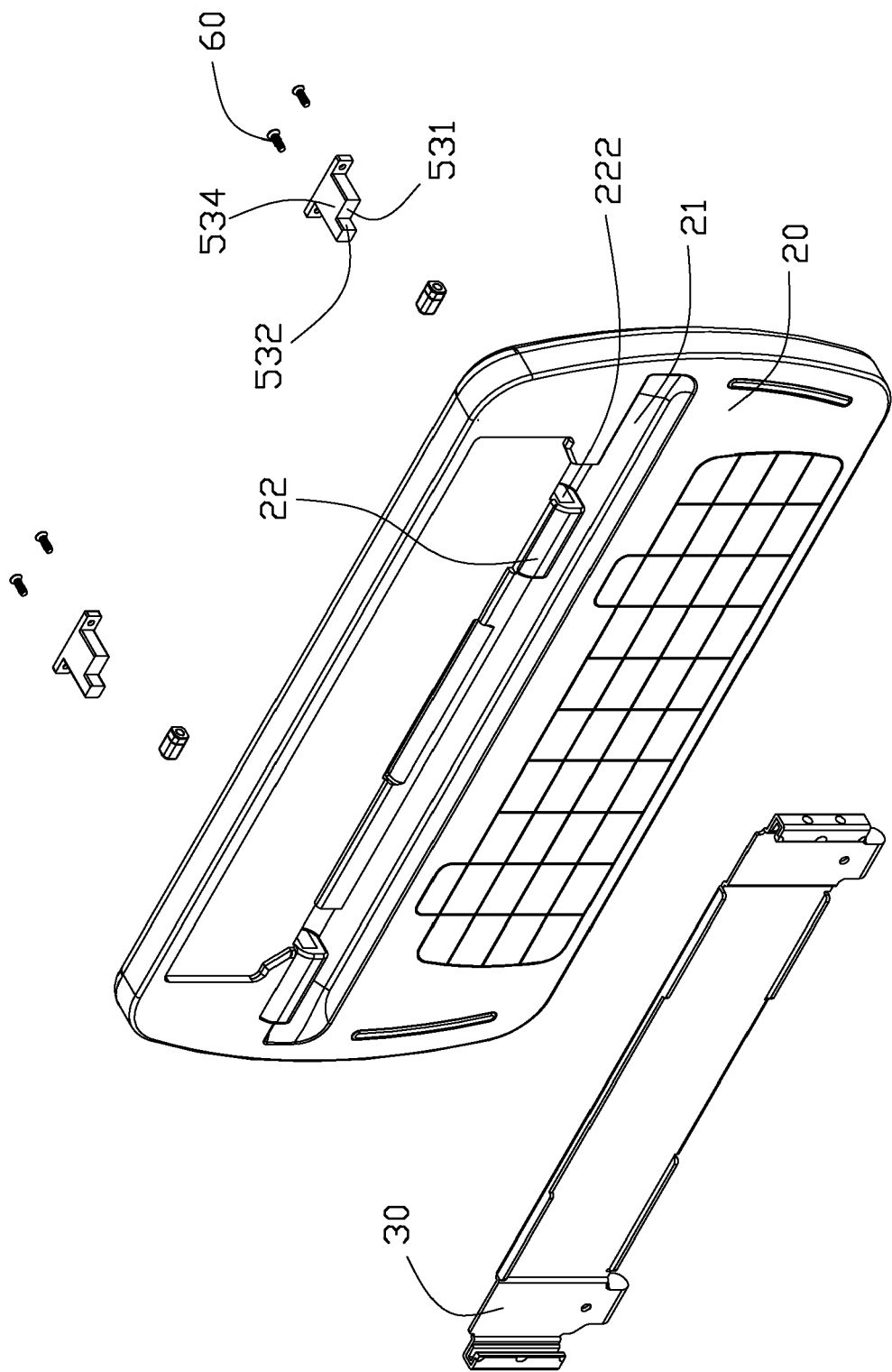
FIG. 5 is similar to FIG. 4, but viewed from another perspective.

Referring to FIGS. 4 and 5, a top of the main body 20 defines a receiving groove 21 for receiving a side of the display 10. The main body 20 includes two first sleeves 22 located on a side of the groove 21. Each first sleeve 22 axially defines a noncircular holding groove 222 therein. A bottom of the main body 20 defines two mounting grooves 24. Each mounting groove 24 communicates with a corresponding holding groove 222. Two mounting portions (not labeled), each defining a screw hole 244, are formed at opposite sides of each mounting groove 24.

Referring to FIG. 3 again, the sliding piece 12 includes two sliding rails 122 at opposite ends thereof.

The rotating member 30 defines two sliding grooves 34 in opposite ends of the rotating member 30, to slidably receive the corresponding sliding rails 122 of the sliding piece 12. Two second sleeves 32 are formed at a bottom side of the rotating member 30. Each second sleeve 32 axially defines a noncircular holding hole 322 therein.

Figure 6:
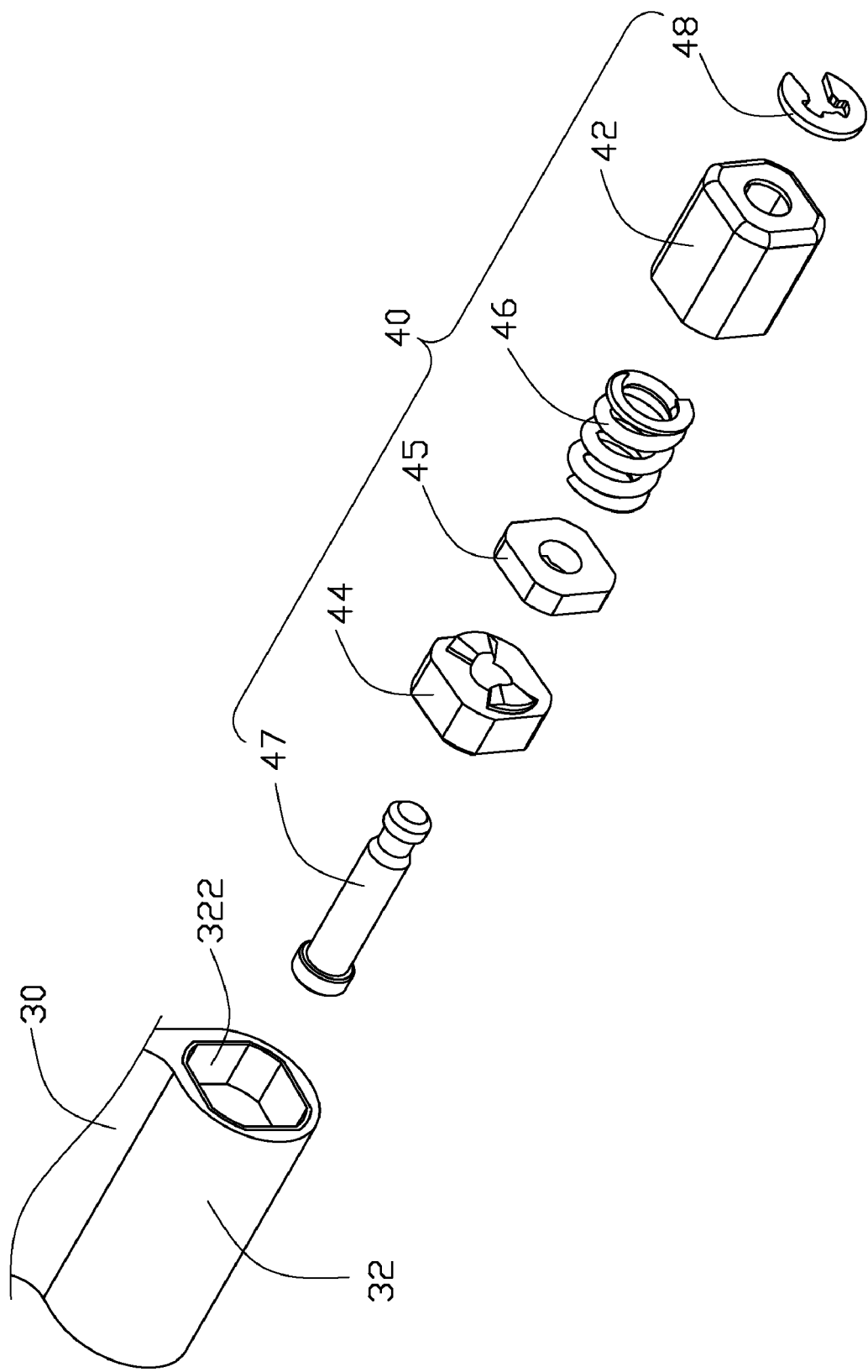
FIG. 6 is an exploded, isometric view of the hinge and the sleeve of the rotating member of FIG. 4.
Figure 7:
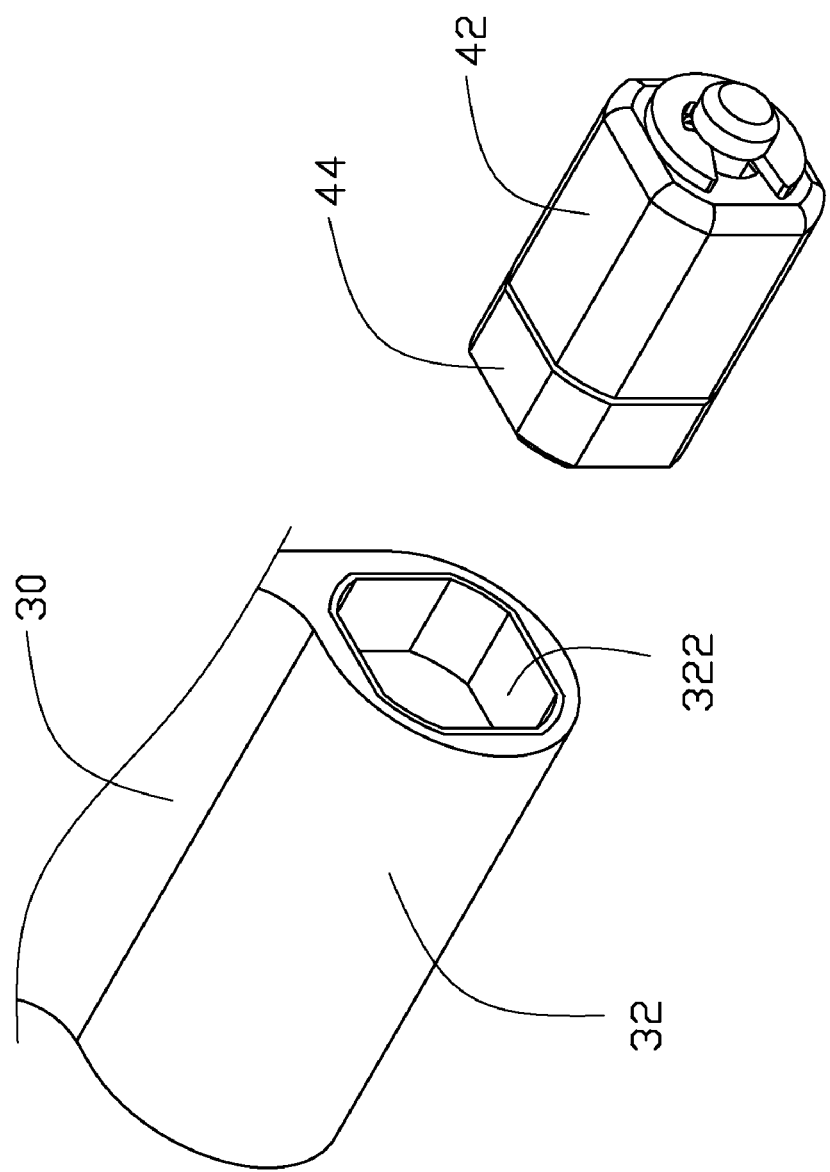
FIG. 7 is a partially assembled, isometric view of the hinge and the sleeve of FIG. 6.

Referring to FIGS. 6 and 7, each hinge 40 includes a first fixed member 42, a second fixed member 44, an interfering member 45, a resilient member 46, a shaft 47, and a fastener 48. The first fixed member 42 is hollow. In assembling the hinge 40, the resilient member 46 and the interfering member 45 are received in the first fixed member 42. The shaft 47 is inserted through the second fixed member 44, the interfering member 45, the resilient member 46, and the first fixed member 42 to be secured to the fastener 48. The first fixed member 42 and the second fixed member 44 are capable of rotating relative to each other. The first fixed member 42 is configured to be fixed to the main body 20, and the second fixed member 44 is configured to be fixed to the rotating member 30.

Referring again to FIGS. 4 and 5, each positioning member 50 includes a mounting board 51 and a positioning block 53 extending from the mounting board 51. Two mounting holes 511 are defined in the mounting board 51 and located at opposite sides of the positioning block 53. The positioning block 53 includes a stepped portion 534 that includes a first positioning surface 531 parallel to the mounting board 51 and a second positioning surface 532 perpendicular to the first positioning surface 531.

In assembly, the rotating member 30 is placed on the top of the main body 20, with the holding holes 322 being in alignment with the holding grooves 222 of the main body 20. Each hinge 40 is placed into the holding groove 222 of the corresponding first sleeve 22 through the corresponding mounting groove 24 from the bottom of the main body 20. The hinge 40 slides in the holding groove 222, with the second fixed member 44 being slid into the corresponding holding hole 322 while the first fixed member 42 is left in the holding groove 222. A corresponding positioning member 50 is inserted into the holding groove 222 via the corresponding mounting groove 24. The first fixed member 42 is engaged with the stepped portion 534. The first positioning surface 531 of the stepped portion 534 resists against a circumference of the first fixed member 42, and the second positioning surface 532 resists against an end surface of the first fixed member 42. Therefore, the hinge 40 is limited in the holding groove 222 and the holding hole 322 by the positioning member 50. Two screws 60 are inserted into the corresponding mounting holes 511, and screwed into the corresponding screw holes 244 to mount the positioning member 50 to the main body 20. Thus, the rotating member 30 is pivotably mounted to the main body 20 via the hinges 40.

The sliding piece 12 is mounted to the back of the display 10 via a plurality of screws. The sliding rails 122 of the sliding piece 12 slide into the corresponding sliding grooves 34 of the rotating member 30. Accordingly, the display 10 is movably mounted to the main body 20 via the sliding rails 122 sliding in the sliding grooves 34. When the bottom side of the display 10 is aligned with the receiving groove 21 of the main body 20, the rotating member 30 can be rotated on the main body 20 to adjust an angle between the display 10 and the main body 20. The bottom side of the display 10 is thus received in the receiving groove 21, to avoid interfering with the main body 20.

In other embodiments, a plurality of elastic elements 70, such as tension springs, may be mounted between the sliding piece 12 and the rotating member 30. When the display 10 is rotated relative to the main body 20, the elastic elements 70 are distorted. When the display 10 is rotated to be parallel to the main body 20, the elastic elements 70 restore to drive the display 10 to slide on the main body 20.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the invention to the full extent indicated by the broad general meaning of the terms in which the appended claims are expressed.

What is claimed is:

1. An electronic device comprising:
    a main body comprising a first sleeve located on a top of the main body, the first sleeve axially defining a noncircular holding groove;
    a rotating member defining a holding hole;
    a display slidably mounted to the rotating member;
    a hinge comprising a first fixed member and a second fixed member rotatable relative to the first fixed member, wherein the second fixed member is held in the holding hole, and the first fixed member is held in the holding groove; and
    a positioning member mounted to the main body, wherein the positioning member comprises a positioning block inserted into the holding groove to secure the first fixed member of the hinge in the holding groove;
    wherein a bottom of the main body defines a mounting groove communicating with the holding groove, and the positioning member is inserted into the holding groove through the mounting groove from the bottom of the main body.

2. The electronic device of claim 1, wherein at least one screw hole is defined in a side of the mounting groove, the positioning member comprises a mounting board with at least one mounting hole defined therein adapted to align with the at least one screw hole.

3. The electronic device of claim 1, wherein the positioning block forms a stepped portion, the stepped portion comprises a first positioning surface resisting against a circumference of the first fixed member, and a second positioning surface resisting against an end surface of the first fixed member.

4. The electronic device of claim 3, wherein the second positioning surface is perpendicular to the first positioning surface.

5. The electronic device of claim 1, wherein the holding hole and the holding groove are noncircular.

6. The electronic device of claim 1, wherein a sliding piece is mounted on the display, the sliding piece comprises two sliding rails at opposite ends of the sliding piece, and the rotating member defines two sliding grooves in opposite ends of the rotating member, to slidably receive the corresponding sliding rails.

7. The electronic device of claim 6, wherein a plurality of elastic elements is mounted between the sliding piece and the rotating member to assist sliding the display on the rotating member.

8. The electronic device of claim 1, wherein the main body defines a receiving groove adapted for receiving a side of the display when the display rotates on the main body.

9. An electronic device comprising:
    a display slidably mounted on a rotating member, the rotating member defining a holding hole;
    a main body comprising a first sleeve located on a top of the main body, the first sleeve axially defining a noncircular holding groove;
    a hinge comprising a first fixed member and a second fixed member adapted to rotate with respect to the first fixed member, wherein the second fixed member is held in the holding hole, and the first fixed member is held in the holding groove; and
    a positioning member mounted on the main body, the positioning member comprising a positioning block, the positioning block comprising a stepped portion, wherein the positioning block is inserted into the holding groove to have the first fixed member of the hinge engaging with the stepped portion to secure the first fixed member in the holding groove;
    wherein the holding groove is defined in a top of the main body, a bottom of the main body defines a mounting groove communicating with the holding groove, and the positioning member is inserted into the holding groove through the mounting groove form the bottom of the main body.

10. The electronic device of claim 9, wherein at least one screw hole is defined in a side of the mounting groove, the positioning member comprises a mounting board with at least one mounting hole defined therein adapted to align with the at least one screw hole.

11. The electronic device of claim 9, wherein the stepped portion comprises a first positioning surface resisting against a circumference of the first fixed member, and a second positioning surface resisting against an end surface of the first fixed member.

12. The electronic device of claim 11, wherein the second positioning surface is perpendicular to the first positioning surface.

13. The electronic device of claim 9, wherein the holding hole and the holding groove are noncircular.

14. The electronic device of claim 9, wherein a sliding piece is mounted on the display, the sliding piece comprises two sliding rails at opposite ends of the sliding piece, and the rotating member defines two sliding grooves in opposite ends of the rotating member, adapted to slidably receive the corresponding sliding rails.

15. The electronic device of claim 14, wherein a plurality of elastic elements is mounted between the sliding piece and the rotating member to assist sliding the display on the rotating member.

16. The electronic device of claim 9, wherein the main body defines a receiving groove adapted for receiving a bottom side of the display when the display rotates on the main body.

* * * * *